United States Patent
Kounik et al.

(10) Patent No.: US 7,346,896 B2
(45) Date of Patent: Mar. 18, 2008

(54) SLOWING NETWORK CONNECTION FOR APPLICATION OPTIMIZATION

(75) Inventors: Kirill Kounik, Tel Aviv (IL); Dov Zandman, Rosh-Haayin (IL)

(73) Assignee: Sun Microsystems, Inc., Santa Clara, CA (US)

( * ) Notice: Subject to any disclaimer, the term of this patent is extended or adjusted under 35 U.S.C. 154(b) by 658 days.

(21) Appl. No.: 10/420,970

(22) Filed: Apr. 22, 2003

(65) Prior Publication Data

US 2004/0040010 A1 Feb. 26, 2004

Related U.S. Application Data

(60) Provisional application No. 60/375,147, filed on Apr. 22, 2002.

(51) Int. Cl.
G06F 9/44 (2006.01)
G06F 9/455 (2006.01)
H04B 1/38 (2006.01)
H04L 1/00 (2006.01)

(52) U.S. Cl. ............ 717/134; 717/124; 717/127; 717/131; 455/566; 370/252; 703/23

(58) Field of Classification Search ............ None
See application file for complete search history.

(56) References Cited

U.S. PATENT DOCUMENTS 6,028,847 A * 2/2000 Beanland .......... 370/252

| 6,414,942 | B1 * | 7/2002 | Ito et al. ............ 370/250 |
| 6,442,141 | B1 * | 8/2002 | Borella et al. ...... 370/248 |
| 6,618,389 | B2 * | 9/2003 | Hoefelmeyer et al. ...... 370/401 |
| 6,845,352 | B1 * | 1/2005 | Wang ............ 703/24 |
| 6,856,943 | B2 * | 2/2005 | Murphy et al. ...... 702/186 |
| 6,901,357 | B1 * | 5/2005 | Patiejunas ............ 703/14 |
| 7,013,255 | B1 * | 3/2006 | Smith, II ............ 703/21 |
| 7,013,257 | B1 * | 3/2006 | Nolan et al. ............ 703/28 |
| 2002/0105921 | A1 * | 8/2002 | Sawyer et al. ...... 370/328 |
| 2002/0143516 | A1 * | 10/2002 | Rao et al. ............ 703/19 |
| 2004/0185786 | A1 * | 9/2004 | Mirbaha et al. ...... 455/67.11 |

OTHER PUBLICATIONS

Bradford, Russell; Simmonds, Rob; Unger, Brian; "Packet Reading for Network Emulation", p. 150-157, 2110 IEEE, retrieved May 15, 2006.*

Muller, Henk; Stallard, Paul; Warren, David; Raina, Sanjay; "Parallel Evaluation of a Parallel Architecture by means of Calibrated Emulation", p. 260-267, IEEE 1994, retrieved May 15, 2006.*

(Continued)

*Primary Examiner*—Mary Steelman
(74) *Attorney, Agent, or Firm*—Meyertons Hood Kivlin Kowert & Goetzel, P.C.; B. Noël Kivlin (57) ABSTRACT

A developer is provided with an emulation tool, which approximates speed conditions of an application executing on a target device, for example a MIDlet executing on a mobile information device, by matching network operations of a development platform to the lesser performance capabilities of the target device. The developer is thereby enabled to optimize an application's network usage early in its development. The time required to perform communications operations in the development environment is increased sufficiently to permit an application developer to more accurately emulate the target device.

16 Claims, 2 Drawing Sheets

OTHER PUBLICATIONS

Padmanabhan, Krishnan; Lo, Steven; Lapone, Aleta; "Architecture of an Emulator Testbed for Heterogeneous ATM/STM Networks", p. 235-239, 1995 IEEE.*

"Mobile Information Device Profile (JSR-37), JCP Specification, Java 2 Platform, Micro Edition, 1.0a," Sun Microsystems, Inc., Palo Alto, CA, Dec. 2000.

* cited by examiner

FIG. 1

FIG. 2

SLOWING NETWORK CONNECTION FOR APPLICATION OPTIMIZATION

CROSS-REFERENCE TO RELATED APPLICATIONS

This Application claims the benefit of Provisional Application No. 60/375,147 filed Apr. 22, 2002. This Application is related to application No. 10/420,971, entitled "Slowing Graphics System for Application Optimization", filed on Apr. 22, 2003.

REFERENCE TO COMPUTER PROGRAM LISTING APPENDIX

A computer program listing appendix is submitted herewith on one compact disc and one duplicate compact disc. The total number of compact discs including duplicates is two. The file on the compact discs is software object code for carrying out the invention.

The name, date of creation, directory location, and size in bytes of the file on the compact disc are: "j2me_wireless_toolkit-1_0_4-hex-win.txt" of Apr. 14, 2002, located in the directory appendix and of length 25,042,094 bytes.

The file j2me_wireless_toolkit-1_0_4-hex-win.txt is a text file in ASCII encoding, which can be converted to binary format. If converted to binary format it can be installed and executed on a Microsoft Windows™ system with J2SE version 1.3 or higher (available from Sun Microsystems, Inc.) installed.

The material on the compact discs is incorporated by reference herein.

BACKGROUND OF THE INVENTION

1. Field of the Invention

This invention relates to computer application development. More particularly, this invention relates to testing and optimization of applications in which there is disparity between the performance of a development environment and a target device.

2. Description of the Related Art

The meanings of acronyms and certain terminology used herein are given in Table 1. The terms Sun, Sun Microsystems, the Sun logo, Java, and J2ME are trademarks or registered trademarks of Sun Microsystems, Inc., in the United States of America and other countries. All other company and product names may be trademarks of their respective companies. A portion of the disclosure of this patent document contains material, which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

TABLE 1

| | |
|---|---|
| API | Application Programming Interface |
| CLDC | Connected Limited Device Configuration |
| GUI | Graphic User Interface |
| J2ME | Java 2 Micro Edition |
| MIDlet | Applications that use MIDP and CLDC API's |
| MIDP | Mobile Information Device Profile |
| ROM | Read-only Memory |

Mobile information devices are an example of the target devices to which the present invention is applicable. The Mobile Information Device Profile (MIDP) defines a set of Java application programming interfaces (API's) that provide an application runtime environment for mobile information devices, such as cellular telephones. The MIDP is defined in the document *Mobile Information Device Profile* (JSR-37), JCP Specification, Java 2 Platform, Micro Edition, 1.0a (Sun Microsystems Inc., Palo Alto, Calif., December 2000), which is incorporated herein by reference. MIDP builds on the Connected Limited Device Configuration (CLDC) of the Java 2 Platform, Micro Edition (J2ME). MIDP applications that use the MIDP and CLDC API's are known as MIDlets.

Many target devices, for example mobile information devices, typically have a very small memory, low-speed graphics, and slow communications performance, when compared with personal computers. While programmers commonly develop applications using personal computers as development platforms, the memory and speed limitations of the target devices must be taken into account in order for the applications to run satisfactorily on the target devices. In particular, a critical optimization in a network-intensive distributed application, or one that is to be deployed on a slow connection, is that it should not use the network or connection any more than necessary. However, most development workstations and some deployment environments have network connections that are so fast that inefficiencies in such applications network usage are not clearly apparent during development. This disparity can cause poor performance on deployed applications. Optimization of an application's network usage early in development can ameliorate this problem.

SUMMARY OF THE INVENTION

In accordance with a disclosed embodiment of the invention, a developer is provided with an emulation tool, which approximates speed conditions of an application executing on a target device, for example a MIDlet executing on a mobile information device, by matching network operations of a development platform to the lesser performance capabilities of the target device. The developer is thereby enabled to optimize an application's network usage early in its development.

According to one disclosed embodiment of the invention, the time required to perform communications operations in the development environment is increased sufficiently to permit an application developer to more accurately emulate a target device.

In accordance with a disclosed embodiment of the invention testing and optimization of network operations to be performed by a target device having limited communications capabilities is enabled by slowing network operations on a development platform.

The invention provides a method of testing a computing application for a computing device, which is carried out by executing the application on a workstation by an emulation of the computing device, executing the application by invoking a network operation on the workstation at least one time, and delaying execution of the network operation by a selected delay interval prior to each invocation of the network operation.

One aspect of the method includes determining whether the emulation satisfied a predetermined testing criterion, and adjusting the delay interval responsively thereto.

Another aspect of the method includes and slowing the network operation such that completion of the network operation is delayed by a preselected time interval.

According to still another aspect of the method, there are a plurality of network operations that are delayed by different preselected time intervals, an amount of data transferred in a first network operation is less than an amount of data transferred in a second network operation, and a preselected time interval of the first network operation is less than a preselected time interval of the second network operation.

The invention provides a computer software product, including a computer-readable medium in which computer program instructions are stored, which instructions, when read by a computer, cause the computer to perform a method for testing a computing application for a computing device, including executing the application on a workstation by an emulation of the computing device, executing the application by invoking a network operation on the workstation at least one time, and delaying execution of the network operation by a selected delay interval prior to each invocation of the network operation.

The invention provides a development system for testing a computing application for a computing device, including a network communication interface, and an emulation processor, adapted to execute the application by an emulation of the computing device, wherein a network operation is performed during the emulation at least one time, causing the emulation processor to communicate via the network communication interface over a data network and to return a result responsively to the network operation, and the emulation processor is further adapted to delay execution of the network operation by a selected delay interval prior to each performance thereof.

According to another aspect of the development system, the emulation processor is programmed to modify the delay interval responsively to an instruction from a user.

According to one aspect of the development system, the emulation processor is programmed to introduce a slowing of the network operation, wherein the network operation is delayed in completing.

The invention provides a method of emulating the performance of a resource constrained device, which is carried out by executing a computing application using an emulator of the device, inserting a delay prior to invocations of network operations that are required by the computing application, and slowing the network operations.

According to one aspect of the method, an amount of data transferred in a first network operation is less than an amount of data transferred in a second network operation, and the first network operation is slowed less than the second network operation.

Yet another aspect of the method includes determining whether a behavior of the computing application satisfied a predetermined testing criterion, and responsively to determining, adjusting at least one of the delay and slowing.

The invention provides a computer software product, including a computer-readable medium in which computer program instructions are stored, which instructions, when read by a computer, cause the computer to perform a method of emulating the performance a resource constrained device, including emulating an execution of a computing application on the device, inserting a delay prior to invocations of network operations that are required by the computing application, and slowing the network operations.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Overview.

Figure 1:
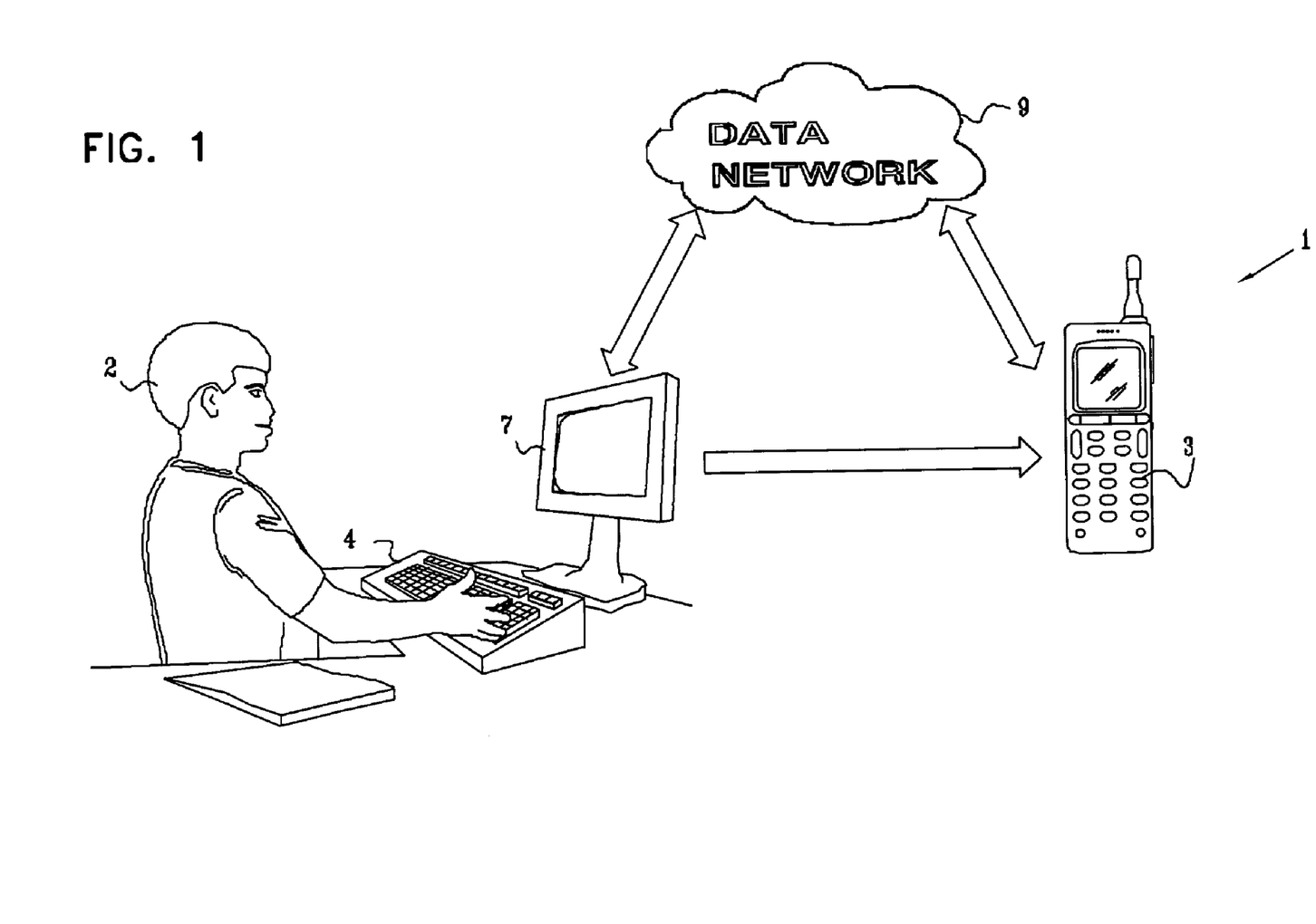
FIG. 1 is a high level block diagram of a development system adapted to optimization of network operations on a resource-constrained mobile information device in accordance with a disclosed embodiment of the invention.

Reference is now made to FIG. 1, which is a high level block diagram of a system 1 that is adapted for development of an application or MIDlet for a target device in accordance with a disclosed embodiment of the invention. Typically, a developer 2 is attempting to create an application for a resource-constrained target device 3. The target device 3 may be MIDP compliant, and is typically a wireless device. Typically, development is done using a conventional workstation 4, such as a personal computer with a display 7. An integrated development environment, for example the Sun ONE Studio, available from Sun Microsystems, Inc., can be installed on the workstation 4 to facilitate development of the application. It is assumed that the application requires access to a data network 9, which can be the Internet. The application is tested by operating the workstation 4 as an emulation processor, that is an emulator of the target device 3. The emulation includes an emulation of the interaction between the target device 3 and the data network 9.

The network communications performance of the workstation 4 is generally far superior to that of the target device 3. Communications operations that are performed flawlessly in the development environment sometimes prove to be disappointing in the field. The inventors have discovered that intentionally slowing the network operations of the workstation 4 prevents such misleading results, and improves the quality of the application for the target device 3.

According to the invention, it is possible to vary the speed of network operations in an emulator independently of modifications within the emulator of other aspects of application performance, for example graphics primitives, and without affecting the other aspects. A GUI may be provided, using programming techniques known to the art, in order to enable the developer 2 to adjust parameters governing network communications operations and the operation of the emulator generally.

Implementation.

Continuing to refer to FIG. 1, the effective network connection speed of the workstation 4 with the data network 9 is reduced in two ways.

First, the throughput of network operations within the application under test is limited to a convenient rate, which is configured to the actual performance of the target device 3. Second, the latency of operations involving the application's network connection is increased. Both are achieved by overriding the application's access to operating system network functions. The general approach is shown in Listing 1.

The pseudocode of Listing 2 implements network throughput emulation. It includes two logical modules. Module 1 contains code that determines the amount of data allowed to be transmitted over the network at any given moment. Calculation of the amount of data in practice is based on configuration parameters, which are omitted in the pseudocode for clarity of presentation. It will be noted that this determination is implemented in critical sections. Module 2 calls system networking functions in order to perform the read or write network operation itself. Further details of the procedures shown in Listing 2 are given in Listing 3.

Once network operations are slowed, the developer 2 can evaluate the effect of the application's network connection on its speed and behavior. Additionally, the developer 2 can better follow the algorithm used by the application in order to perform necessary optimizations than would be possible without limiting the throughput of network operations.

Figure 2:
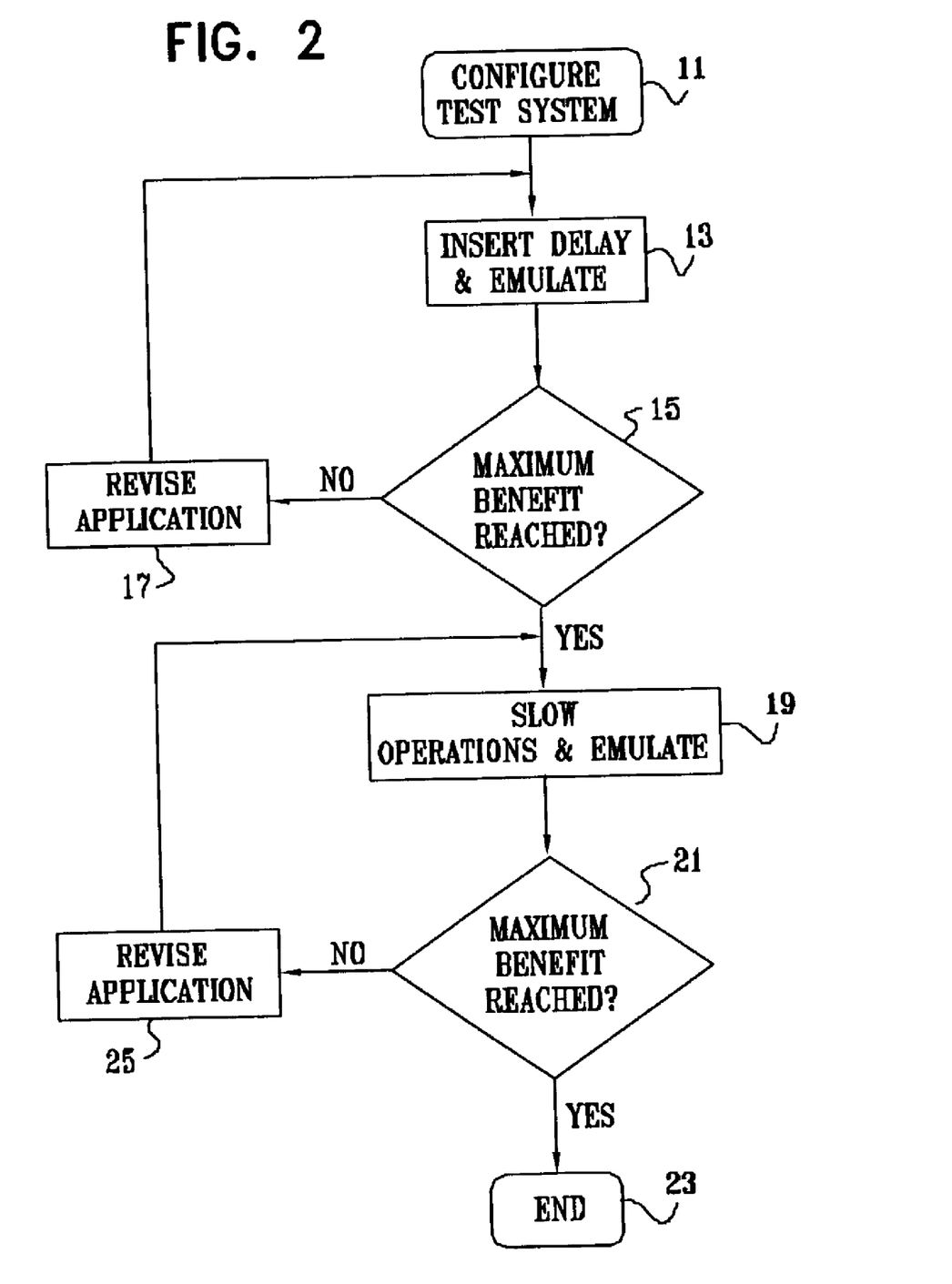
FIG. 2 is a flow chart illustrating a method of testing and optimizing an application intended to execute on a resource-constrained target device in accordance with a disclosed embodiment of the invention.

Reference is now made to FIG. 2, which is a flow chart illustrating a method of testing and optimizing an application intended to execute on a resource-constrained target device in accordance with a disclosed embodiment of the invention. The methods disclosed hereinbelow are by no means restricted to Java applications, MIDP applications, or applications for slow devices. Rather, the techniques are applicable to any network-intensive application on any platform. The sequence of applying the inventive techniques shown in FIG. 2 is exemplary, and it is possible to perform the steps in many different orders, as will occur to those skilled in the art. The process begins at initial step 11, wherein software is prepared. Here a developer identifies characteristics of the client, particularly its requirements for network access. A development test system is configured to run the software by emulating the target device. The development test system can include a high performance workstation or personal computer.

Next, at step 13, a delay $t_1$ is inserted prior to initiation of network operations in the development test system that was configured in initial step 11. It is anticipated that the delay $t_1$ may need to be varied over a predefined range. Thus in some applications, the delay $t_1$ can be initially set at the midpoint of the predefined range, and adjusted according to emulation results. Alternatively, the delay $t_1$ can be initially set at one extreme end of the range, and systematically adjusted toward the other end of the range until satisfactory emulation results occur, or the range is exhausted. In some embodiments, satisfactory emulation is determined by direct observation of the display of the development test system. Test runs of the application are conducted in emulation mode using the development test system that was configured in initial step 11.

Next, at decision step 15, a determination is made whether step 13 resulted in maximum benefit in the emulation of the network operations of the target device. Typical evaluation criteria include, but are not limited to subjective and objective measurement of performance characteristics, such as "smoothness" of graphics and other display presentation. Optimization of timeouts in the application may be used to determine maximum benefit in an example, in which a cellular telephone network allows a number of rings before timing out. Emulation of a telephone service known to have a slow response may require a longer timeout than another service where a faster response is anticipated. Similarly, the amount of data allowed to be transmitted on the network may be limited to an optimum value. Thus, a user charged for air time using a mobile phone network would prefer to minimize connection time. Network speed emulation may be used as a criteria to limit a device's connection time. In such examples, various tradeoffs are invariably involved, and figures of merit must be defined.

Step 13 and decision step 15 are performed iteratively. Generally, in the first iteration it is not possible to determine if maximum benefit has been obtained and the determination of decision step 15 is negative. In subsequent iterations, the performance of the present iteration is compared with that of the previous iteration. When an increment of performance determined in successive iterations falls below a predetermined minimum threshold, it is concluded that the process has converged to point of maximum benefit.

If the determination at decision step 15 is negative, then control proceeds to step 17. Here it is necessary to reevaluate the application under test, and to determine if coding changes are required to improve the display and otherwise optimize the code. After performance of step 17, control returns to step 13 to begin a new iteration.

If the determination at decision step 15 is affirmative, then yet another technique is applied. Control proceeds to step 19. The throughput of the network operations of the development test system is reduced by slowing the actual operations by a designated amount, which is typically proportional to the amount of data being transferred in the network operation. Thus, a network operation in which only a small amount of data is transferred generally needs to be slowed less than a network operation in which a large amount of data is transferred. Using the delay value that was optimized in sequence beginning with step 13, the emulation is repeated. The variation in the speed of the network operations is adjusted in different iterations of step 19.

Next, at decision step 21, a determination is made whether this technique resulted in maximum benefit in emulating the network functions of the target device. Step 19 and decision step 21 are performed iteratively. Generally, in the first iteration it is not possible to determine if maximum benefit has been obtained, and the determination of decision step 21 is negative. In subsequent iterations, the performance of the present iteration is compared with that of the previous iteration. When an increment of performance determined in successive iterations falls below a predetermined minimum threshold, it is concluded that the process has converged to point of maximum benefit. Evaluation of the network operations is done in the same manner as described above with reference to decision step 15. If the determination at decision step 21 is affirmative, then the procedure ends at final step 23.

If the determination at decision step 21 is negative, then control proceeds to step 25. Here the application is re-evaluated. This is accomplished in the same manner as step 17. The details are not repeated. After performance of step 25, control returns to step 19 to begin a new iteration.

Reevaluation of the application at step 17 and step 25 at two different points in the evaluation and optimization process can expose rich opportunities for code optimization, as the effects of performing different network operations are observed directly, and under different conditions in the separate emulations of step 13 and step 19.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

COMPUTER PROGRAM LISTINGS

Listing 1

```
For each line of the code that calls a network primitive:
   Delay( /* configurable amount of time */);
   CallNetworkPrimitive( );
```

Listing 2

```
//Module 1.
GetReadQuota (parameter: "Requested Amount Of Data" for reading)
//returns: amount of data allowed for real reading from the network
{
START_CRITICAL_SECTION
beginning:
   AllowedToRead = Calulate Amount Of Data Allowed To Read( );
   IF ( AllowedToRead > 0 )
   {
     IF (Requested Amount Of Data > AllowedToRead)
     {
        RETURN AllowedToRead;
     }
     ELSE
     {
        RETURN "Requested Amount Of Data";
     }
   }
   ELSE
   {
     "Wait Until It Is Allowed To Read Again"
     GOTO beginning
   }
END_CRITICAL_SECTION
}
GetWriteQuota(parameter: "Requested Amount Of Data" for writing)
//returns: amount of data allowed for real writing the network
{
START_CRITICAL_SECTION
beginning:
   AllowedToWrite = Calulate Amount Of Data Allowed To Write( );
   IF ( AllowedToWrite > 0 )
   {
     IF (Requested Amount Of Data > AllowedToWrite)
     {
        RETURN AllowedToWrite;
     }
     ELSE
     {
       RETURN "Requested Amount Of Data";
     }
```

COMPUTER PROGRAM LISTINGS

-continued

```
   }
   ELSE
   {
     Wait Until It Is Allowed To Write Again"
     GOTO beginning
   }
END_CRITICAL_SECTION
}
//Module 2
--------------
MyReadFromNetwork(parameter: Requested Amount To Read)
{
   LeftToRead = Requested Amount To Read;
   WHILE (LeftToRead > 0)
   {
     AllowedToReadThisTime = GetReadQuota(LeftToRead);
     SystemReadFromNetwork(AllowedToReadThisTime);
     LeftToRead = LeftToRead - AllowedToReadThisTime;
   }
}
MyWriteToNetwork(parameter: Requested Amount To Write)
{
   LeftToWrite = Requested Amount To Write;
   WHILE (LeftToWrite > 0)
   {
     AllowedToWriteThisTime = GetWriteQuota(LeftToWrite);
     SystemReadFromNetwork(AllowedToWriteThisTime);
     LeftToWrite = LeftToWrite - AllowedToWriteThisTime;
   }
}
```

Listing 3

```
/*
 *
 * Copyright 2000, 2001 Sun Microsystems, Inc.
 * All rights reserved.
 * Use is
 * subject to license terms
 */
#include <global.h>
#include <speed.h>
#if ASYNCHRONOUS_NATIVE_FUNCTIONS
#ifdef WIN32
#include <winbase.h>
#define MUTEX_INIT(mx)    InitializeCriticalSection(mx)
#define MUTEX_LOCK(mx)    EnterCriticalSection(mx)
#define MUTEX_UNLOCK(mx) LeaveCriticalSection(mx)
static CRITICAL_SECTION readmx, writemx;
#else
#include <pthread.h>
#define MUTEX_INIT(mx)
#define MUTEX_LOCK(mx)     pthread_mutex_lock(mx)
#define MUTEX_UNLOCK(mx) pthread_mutex_unlock(mx)
static pthread_mutex_t readmx = PTHREAD_MUTEX_INITIALIZER,
                        writemx = PTHREAD_MUTEX_INITIALIZER;
#endif /* WIN32 */
#else
#define MUTEX_INIT(mx)
#define MUTEX_LOCK(mx)
#define MUTEX_UNLOCK(mx)
#endif /* ASYNCHRONOUS_NATIVE_FUNCTIONS */
#define YIELD_TIME 20
int enable_nethrouput; /* indicates if network throuput emulation is
enabled */
struct netspeed_cfg {
     int sampled_period; /* in millisecons */
     /* Maximum allowed quota per request */
     int packetsize;
     /* Maximum read/write quota allowed for one request */
     int period_quota;
};
/* Order of the configurations in this table MUST correspond to the order of
 * the strings in Device.netSpeedList array
 */
 * static struct netspeed_cfg cfg_table[ ] = {
     { 500, 25, 75 },   /* 1200 bps */
```

-continued

COMPUTER PROGRAM LISTINGS

```
    { 250, 25, 75 },     /* 2400 bps */
    { 100, 40, 120 },    /* 9600 bps */
    { 100, 45, 180 },    /* 14400 bps */
    { 100, 48, 240 },    /* 19200 bps */
    { 100, 72, 360 },    /* 28800 bps */
    { 100, 84, 420 },    /* 33600 bps */
    { 100, 140, 700 },   /* 56000 bps */
    { 100, 280, 1400 }   /* 112000 bps */
};
/* Current configutation */
static struct netspeed_cfg *cfg = 0;
/* Last sampled time */
static ulong64 writetime = 0, readtime = 0;
/* Number of bytes written after the last sampled time */
static int writelen = 0, readlen = 0;
/*--------------------------------------------------------------------
 * get_read_quota( )
 *
 * Get the number of bytes allowed to read to the calling thread.
 * If returned
 * value is 0 it means that there will not be quota available
 * soon and it
 * is probably good to the calling thread stop read attempts
 * for some * time.
 * (for example it is time return what is already
 * read or reschedule)
 *--------------------------------------------------------------------
 */
static int get_read_quota(int ask)
{
    int quota = ask;
    ulong64 passed, now;
    int leftlen;
    if (quota > cfg->packetsize)
    quota = cfg->packetsize;
        MUTEX_LOCK(&readmx);
        now = CurrentTime_md( );
        passed = now - readtime;
        if (passed > cfg->sampled_period)
        {
    readtime = now;
            readlen = quota;
        }
        else if (readlen < cfg->period_quota)
        {
    leftlen = cfg->period_quota - readlen;
            quota = quota < leftlen ? quota : leftlen;
    readlen += quota;
        }
        else
        {
#if ASYNCHRONOUS_NATIVE_FUNCTIONS
            readlen = quota;
            readtime += cfg->sampled_period;
    do
    {
/* Sometimes sleep is shorter than required.
 * Make it reliable by
 * checking again that time passed was as requested
 */
            SLEEP_UNTIL(readtime);
         now = CurrentTime_md( );
    } while (now < readtime);
#else
         quota = 0;
         SLEEP_UNTIL(now + YIELD_TIME);
#endif /* ASYNCHRONOUS_NATIVE_FUNCTIONS */
        }
        MUTEX_UNLOCK(&readmx);
        return quota;
}
/*--------------------------------------------------------------------
 * get_write_quota( )
 *
 * Get the number of bytes allowed to write for the calling
 * thread.
 * If returned value is 0 it means that there will not be quota
 * available soon
 * and it is probably good to the calling thread stop
 * write attempts
 * for some time. (for example it is time return what is
 * already read or reschedule)
 *
 *--------------------------------------------------------------------
 */
static int get_write_quota(int ask)
{
    int quota = ask;
    ulong64 passed, now;
    int leftlen;
    if (quota > cfg->packetsize)
       quota = cfg->packetsize;
        MUTEX_LOCK(&writemx);
        now = CurrentTime_md( );
        passed = now - writetime;
        if (passed > cfg->sampled_period)
        {
    writetime = now;
    writelen = quota;
        }
        else if (writelen < cfg->period_quota)
        {
    leftlen = cfg->period_quota - writelen;
    quota = quota < leftlen ? quota : leftlen;
    writelen += quota;
        }
        else
        {
#if ASYNCHRONOUS_NATIVE_FUNCTIONS
            writelen = quota;
            writetime += cfg->sampled_period;
    do
    {
   /* Sometimes sleep is shorter than required.
    * Make it reliable by
    * checking again that time passed was as requested
    */
    SLEEP_UNTIL(writetime);
    now = CurrentTime_md( );
    } while (now < writetime);
#else
    quota = 0;
    SLEEP_UNTIL(now + YIELD_TIME);
#endif /* ASYNCHRONOUS_NATIVE_FUNCTIONS */
        }
        MUTEX_UNLOCK(&writemx);
        return quota;
}
/*--------------------------------------------------------------------
 * get_available( )
 *
 * Get the number of bytes available in the stream.
 * Returns the number of
 * bytes that can be read without looping
 *--------------------------------------------------------------------
 */
static int get_available(int ask)
{
    if (ask > cfg->packetsize)
    {
   return cfg->packetsize;
    }
    else
    {
   return ask;
    }
}
/*--------------------------------------------------------------------
 * init_net_speed( )
 * Initialise resources related to the network
 * speed emulation. Initializes
 * two mutexes, which protect network speed manager's data from
 * multithread access.
```

-continued

COMPUTER PROGRAM LISTINGS

```
 *
 *----------------------------------------------------------------
 */
void init_net_speed(int mode) {
    MUTEX_INIT(&readmx);
    MUTEX_INIT(&writemx);
    if (mode < 0)
    {
   enable_nethrouput = 0;
    }
    else
    {
   enable_nethrouput = 1;
   cfg = &cfg_table[mode];
    }
}
/*----------------------------------------------------------------
 * prim_com_sun_cldc_io_j2me_socket_Protocol_read1
 *
 * Proxy function, which cares for the network speed emulation
 * for socket read operations
 *----------------------------------------------------------------
 */
int prim_com_sun_cldc_io_j2me_socket_Protocol_read1(int fd, char *buffer,
                 int length)
{
    int res;
    /*
     * Use J2ME Wireless Toolkit mechanizm for network
     * speed emulation
     */
    if (enable_nethrouput)
    {
    /* A complication here is a way we report an error condition
     * combined from the number of read addemts
     * as an error condition
     * of one read operation. Error will be reported is any of the
     * requests fails.
     * Another complication is the case when actual number of bytes
     * available in the sream is less then required
     * total length. In
     * order to prevent the condition when we do not
     * return until all
     * required bytes are read, the number of attempts to read from
     * the socket will be enough to read all data in perfect
     * conditions.
     */
    int tmpres, quota, reallyread = 0, wouldread = 0;
    do
    {
        quota = get_read_quota(length - reallyread);
        #if ! ASYNCHRONOUS_NATIVE_FUNCTIONS
        if (quota == 0)
            break;
#endif
        wouldread += quota;
        tmpres = prim_com_sun_cldc_io_j2me_socket_Protocol_
            read0(fd, buffer + reallyread, quota);
        if (tmpres < 0)
        {
   reallyread = tmpres;
   break;
        }
        else
        {
   reallyread += tmpres;
        }
    } while (wouldread < length);
#if ASYNCHRONOUS_NATIVE_FUNCTIONS
    res = reallyread;
#else
    res = (wouldread == 0 && quota == 0) ? -2 : reallyread;;
#endif
    }
    else
    {
```

-continued

COMPUTER PROGRAM LISTINGS

```
        res = prim_com_sun_cldc_io_j2me_socket_Protocol_read0(fd,
                 buffer, length);
    }
    return res;
}
/*----------------------------------------------------------------
 * prim_com_sun_cldc_io_j2me_socket_Protocol_available1
 *
 * Proxy function, which cares for the network speed emulation
 * for socket available operations.
 *----------------------------------------------------------------
 */
int prim_com_sun_cldc_io_j2me_socket_Protocol_available1(int fd)
{
    int res = prim_com_sun_cldc_io_j2me_socket_Protocol_
    available0(fd);
    if (enable_nethrouput)
    {
        res = get_available(res);
    }
    return res;
}
/ *----------------------------------------------------------------
 * prim_com_sun_cldc_io_j2me_socket_Protocol_write1
 *
 * Proxy function, which cares for the network speed emulation
 * for socket write operations.
 *----------------------------------------------------------------
 */
int prim_com_sun_cldc_io_j2me_socket_Protocol_write1(int fd, char *buffer, int length)
{
    int res;
    /*
     * Use J2ME Wireless Toolkit mechanizm for network
     * speed emulation
     */
    if (enable_nethrouput)
    {
    /* A comlication here is a way we report an error condition
     * combined from the number of write addemts
     * as an error condition
     * of one write operation. Error will be reported is any of the
     * requests fails.
     * Another complication is the case when actual number of bytes
     * available in the stream is less then required total length.
     * In order to prevent the condition when we do not
     * return until all
     * required bytes are written, the number of attempts
     * to write to
     * the socket will be enough to write all data in perfect
     * condition.
     */
    int tmpres, quota, reallywrote = 0, wouldwrite = 0;
    do
    {
        quota = get_write_quota(length - reallywrote);
#if ! ASYNCHRONOUS_NATIVE_FUNCTIONS
        if (quota == 0)
            break;
#endif
        wouldwrite += quota;
        tmpres = prim_com_sun_cldc_io_j2me_socket_Protocol_
            write0 (fd, buffer + reallywrote,quota);
        if (tmpres < 0)
        {
        /* Error */
        reallywrote = tmpres;
        break;
        }
        else
        {
        reallywrote += tmpres;
        }
    } while (wouldwrite < length);
    res = reallywrote;
    }
```

COMPUTER PROGRAM LISTINGS
-continued

```
  else
  {
res = prim_com_sun_cldc_io_j2me_socket_Protocol_write0(fd,
       buffer, length);
  }
  return res;
}
```

The invention claimed is:

1. A method for testing a software application to be deployed in a wireless device, comprising:
executing the software application on a test computer system, wherein the test computer system includes emulation code and emulates operation of the wireless device, and wherein the software application includes one or more network commands for invoking a network operation;
in response to execution of the one or more network commands, the emulation code emulating operation of the wireless device by causing introduction of a preselected delay and, subsequent to expiration of the preselected delay, causing initiation of the network operation; and
the emulation code additionally emulating operation of the wireless device by limiting throughput of data conveyed through a corresponding network during performance of the network operation.

2. The method as recited in claim 1 further comprising:
reexecuting the software application; and
in response to reexecution of the network command, the emulation code causing introduction of a different preselected delay and, subsequent to expiration of the different preselected delay, causing reinitiation of the network operation.

3. The method as recited in claim 2 further comprising the emulation code determining an amount of data that can be conveyed over the network during a selected interval.

4. The method as recited in claim 1 further comprising the emulation code determining an amount of data that can be conveyed over the network during a selected interval.

5. The method as recited in claim 1 further comprising:
determining whether the execution of the software application on the test computer satisfied a predetermined testing criterion; and
responsive to said determining, adjusting the preselected delay.

6. The method as recited in claim 1 wherein further comprising the emulation code slowing a completion of the network operation by limiting the throughput of data conveyed through the corresponding network.

7. A system for testing a software application to be deployed in a wireless device, comprising:
a computer-readable storage medium that stores the software application, wherein the software application includes one or more network commands for invoking a network operation; and
a test computer configured to execute the software application, wherein the test computer emulates operation of the wireless device and includes emulation code stored in a memory, wherein the emulation code is executable by the test computer to emulate operation of the wireless device by:
in response to execution of the one or more network commands, causing introduction of a preselected delay and, subsequent to expiration of the preselected delay, causing initiation of the network operation; and
limiting throughput of data conveyed through a corresponding network during performance of the network operation.

8. The system as recited in claim 7 wherein the test computer is further configured to reexecute the software application; and wherein the emulation code is executable by the test computer to, in response to reexecution of the network command, cause introduction of a different preselected delay and, subsequent to expiration of the different preselected delay, cause reinitiation of the network operation.

9. The system as recited in claim 8 wherein the emulation code is executable by the test computer to determine an amount of data that can be conveyed over the network during a selected interval.

10. The system as recited in claim 7 wherein the emulation code is executable by the test computer to determine an amount of data that can be conveyed over the network during a selected interval.

11. The system as recited in claim 7 wherein the emulation code is executable by the test computer to slow a completion of the network operation by limiting the throughput of data conveyed through the corresponding network.

12. A computer-readable storage medium for use in a test computer for testing a software application to be deployed in a wireless device, wherein the software application includes one or more network commands for invoking a network operation, the computer-readable storage medium storing emulation code executable by the test computer to:
execute the software application; and
emulate operation of the wireless device, wherein emulating operation of the wireless device includes:
in response to execution of the one or more network commands, causing introduction of a preselected delay and, subsequent to expiration of the preselected delay, causing initiation of the network operation; and
limiting throughput of data conveyed through a corresponding network during performance of the network operation.

13. The computer-readable storage medium as recited in claim 12 wherein the emulation code is further executable by the test computer to:
reexecute the software application; and
in response to reexecution of the network command, cause introduction of a different preselected delay and, subsequent to expiration of the different preselected delay, cause reinitiation of the network operation.

14. The computer-readable storage medium as recited in claim 13 wherein the emulation code is executable by the test computer to determine an amount of data that can be conveyed over the network during a selected interval.

15. The computer-readable storage medium as recited in claim 12 wherein the emulation code is executable by the test computer to determine an amount of data that can be conveyed over the network during a selected interval.

16. The computer-readable storage medium as recited in claim 12 wherein the emulation code is executable by the test computer to slow a completion of the network operation by limiting the throughput of data conveyed through the corresponding network.

* * * * *